(12) United States Patent
Appleford et al.

(10) Patent No.: US 6,572,076 B1
(45) Date of Patent: Jun. 3, 2003

(54) VALVE ACTUATOR

(75) Inventors: David Eric Appleford, Epping (GB); Brian William Lane, Canvey Island (GB); Benjamin McGeever, Cheltenham (GB)

(73) Assignee: Alpha Thames Ltd., Essex (GB)

( * ) Notice: Subject to any disclaimer, the term of this patent is extended or adjusted under 35 U.S.C. 154(b) by 0 days.

(21) Appl. No.: 10/069,486

(22) PCT Filed: Aug. 18, 2000

(86) PCT No.: PCT/GB00/03215
§ 371 (c)(1),
(2), (4) Date: May 31, 2002

(87) PCT Pub. No.: WO01/14775
PCT Pub. Date: Mar. 1, 2001

(30) Foreign Application Priority Data

Aug. 25, 1999 (GB) .............................. 9920166

(51) Int. Cl.$^7$ .............................. F16K 31/04
(52) U.S. Cl. ........................................ 251/69
(58) Field of Search ..................... 251/66–74

(56) References Cited

U.S. PATENT DOCUMENTS 3,625,475 A * 12/1971 Stephens et al. ............. 251/111
3,778,027 A * 12/1973 Collins et al. ................ 251/74
5,261,446 A * 11/1993 Baker ........................... 251/73
5,575,306 A * 11/1996 Taylor ........................... 251/73

FOREIGN PATENT DOCUMENTS

| DE | 82 25 214 | 1/1986 |
| DE | 195 16 054 A 1 | 11/1995 |
| DE | 196 50 947 A 1 | 6/1998 |
| DE | 298 01 229 U 1 | 7/1998 |

* cited by examiner

Primary Examiner—Paul J. Hirsch
(74) Attorney, Agent, or Firm—Summa & Allan, P.A.

(57) ABSTRACT

A valve actuator (1) is provided which comprises an actuator stem (4) extending from a housing (2) which contains a sleeve (17). The actuator stem (4) is driven so as to cause the sleeve to compress a stack of springs (22) within the housing until bolts (25) engage the sleeve, locking the springs in a compressed state. At the same time an armature (28) on the actuator stem is attracted to an electromagnet (29) within the housing. The actuator stem can then be driven to open or close a valve in a controlled manner without first compressing or releasing the springs. In an emergency, the electromagnet is switched off, releasing the armature thus unlocking the stack of springs. The released springs push the piston which partially retracts the actuator stem into the housing causing the valve to be closed.

25 Claims, 9 Drawing Sheets

VALVE ACTUATOR

BACKGROUND OF THE INVENTION

The present invention relates to a valve actuator and particularly to a valve actuator for use underwater.

Underwater valves may be operated by valve actuators which are used to open or close the valves in a slow controlled manner. However, it may be necessary to quickly close or open a valve, for example, in an emergency, or on loss of power, instead of in the slower controlled manner.

Typical valve actuators which can close a valve in an emergency have a drive mechanism for opening the valve in a controlled manner and springs for causing the valve actuator to rapidly close the valve. The drive mechanism energises the springs as the valve is opened by compressing the springs so that they store energy to operate. However, a problem with these actuators is that although the springs are energised by the drive mechanism, the drive mechanism also works against the springs during each complete valve operating cycle causing high power consumption.

DE-A-19650947 discloses a valve actuator with a housing and first and second co-axial actuating members coupled together by an axial coupling within the housing, the second actuating member being connected to a plunger valve. A motor on the outside of the housing drives the first actuating member via gearing transmission and hence causes the coupled second actuating member to be moved so as to open or close the plunger valve in a controlled manner. Within the coupling, a spring connects a first coupling member which is fixed to the end of the first actuating member, to a second coupling member which is fixed to the second actuating member. The spring is kept in a compressed state by latches in the first coupling member engaging an annular groove in the second actuating member, the latches being held in place by an electromagnet. If power supply fails, the electromagnet causes the latches to disengage from the groove, and hence causes the second actuating member to be moved by the released spring to close the plunger valve.

DE-A-19516054 also discloses a valve actuator with a housing. Inside the housing is a motor which drives a spindle to open or close a valve in a controlled manner. The motor is slidably mounted within the housing and is fixed to a plunger which is received by an electromagnet in the housing. The motor is also connected to the housing by a spring. The spring is kept in a compressed state by the electromagnet holding the plunger. In the event of power failure, the electromagnet releases the plunger causing the motor and spindle to be moved by the released spring, to close the valve.

SUMMARY OF THE INVENTION

It is therefore an object of the present invention to provide a valve actuator for operating a valve in a controlled manner, which can also rapidly close or open a valve and which removes the above mentioned problem.

According to one aspect of the present invention there is provided a valve actuator comprising:

a housing;

an actuating member partly contained within the housing and movable relative to the housing;

drive means arranged to drive the actuating member between first and second positions to reconfigure a valve between first and second states;

energisable resilient means within the housing;

locking means for locking the resilient means in an energised state, the locking means permitting the drive means to drive the actuating member from either of its positions to its other position without substantially energising or de-energising the resilient means when the resilient means is locked by the locking means;

release means for releasing the resilient means from the locking means, to cause the actuating member to be moved under the influence of de-energisation of the resilient means to one of its positions and thereby reconfigure the valve from one to the other of its states; and the locking means includes the load transfer means which is slidably mounted about the actuating member; and the resilient means is arranged to be energised by the drive means operatively engaging the actuating member and moving the load transfer means relative to the housing and the actuating member to a position in which the locking means can lock the resilient means in an energised state.

The resilient means are used to close or open a valve in an emergency. The resilient means may comprise at least one spring which is arranged to be energised and locked in place by the locking means, allowing the valve to be subsequently operated without working against the or each spring. This results in a valve actuator having a low power consumption.

The housing may substantially contain the drive means, the resilient means, the locking means and the release means.

It may be desirable for the actuating member to have a stop for engaging the housing, the drive means causing the resilient means to be energised when the stop has engaged the housing.

The load transfer means may comprise a piston like member. The drive means may be rigidly connected to the load transfer means.

It may be desirable for the locking means to comprise at least one movable bolt held substantially within carrier means rigidly connected to the housing. The locking means may comprise bolt engaging means for engaging said at least one bolt, said bolt engaging means being connected to the release means and being slidably mounted within the housing. The locking means may comprise at least one recess in the load transfer means, the or each recess arranged to receive at least one bolt forcibly engaged by the bolt engaging means to lock the resilient means in an energised state. There may be a plurality of bolts, and the carrier means may comprise radially disposed guides, each guide containing one of the bolts and each bolt being radially displaceable. The bolt engaging means may comprise wedging means or annular frusto-conical wedge.

The release means may include a first release part connected to the bolt engaging means and displacable with respect to the housing, and a second release part fixed with respect to the housing, the first and second release parts arranged to be biasable towards each other. The first and second release parts desirably comprise an electromagnet and material attractable to the electromagnet when the electromagnet is magnetised.

Conveniently, the drive means operably engages the actuating member by threaded engagement means. The actuating member may have a screw shaft and the drive means may have threaded means for engaging the screw shaft so as to drive the actuating member. The threaded means may comprise rolling elements for engaging the screw shaft. The drive means may include a rotary motor which drives the threaded means and surrounds the screw shaft. The rotary motor may be rigidly connected to the inside of the piston like member.

The valve actuator may be operable underwater.

According to another aspect of the present invention there is provided a method of operating a valve actuator, comprising an actuating member partly contained within a housing, comprising the steps of:

biasing load transfer means displaceably mounted within the housing relative to the housing by resilient means within the housing;

locking the resilient means in an energised state;

driving the actuating member by drive means between first and second positions to reconfigure a valve between first and second states without substantially energising or de-energising the resilient means; and releasing the resilient means from being locked, causing the actuating member to be moved under the influence of de-energisation of the resilient means to one of its positions and thereby reconfigure the valve from one to the other of its states; characterized by the steps of slidably mounting the load transfer means about the actuating member within the housing; and operatively engaging the actuating member with the drive means to move the load transfer means relative to the housing and the actuating member to energise the resilient means before the locking step.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENT

Figure 1:
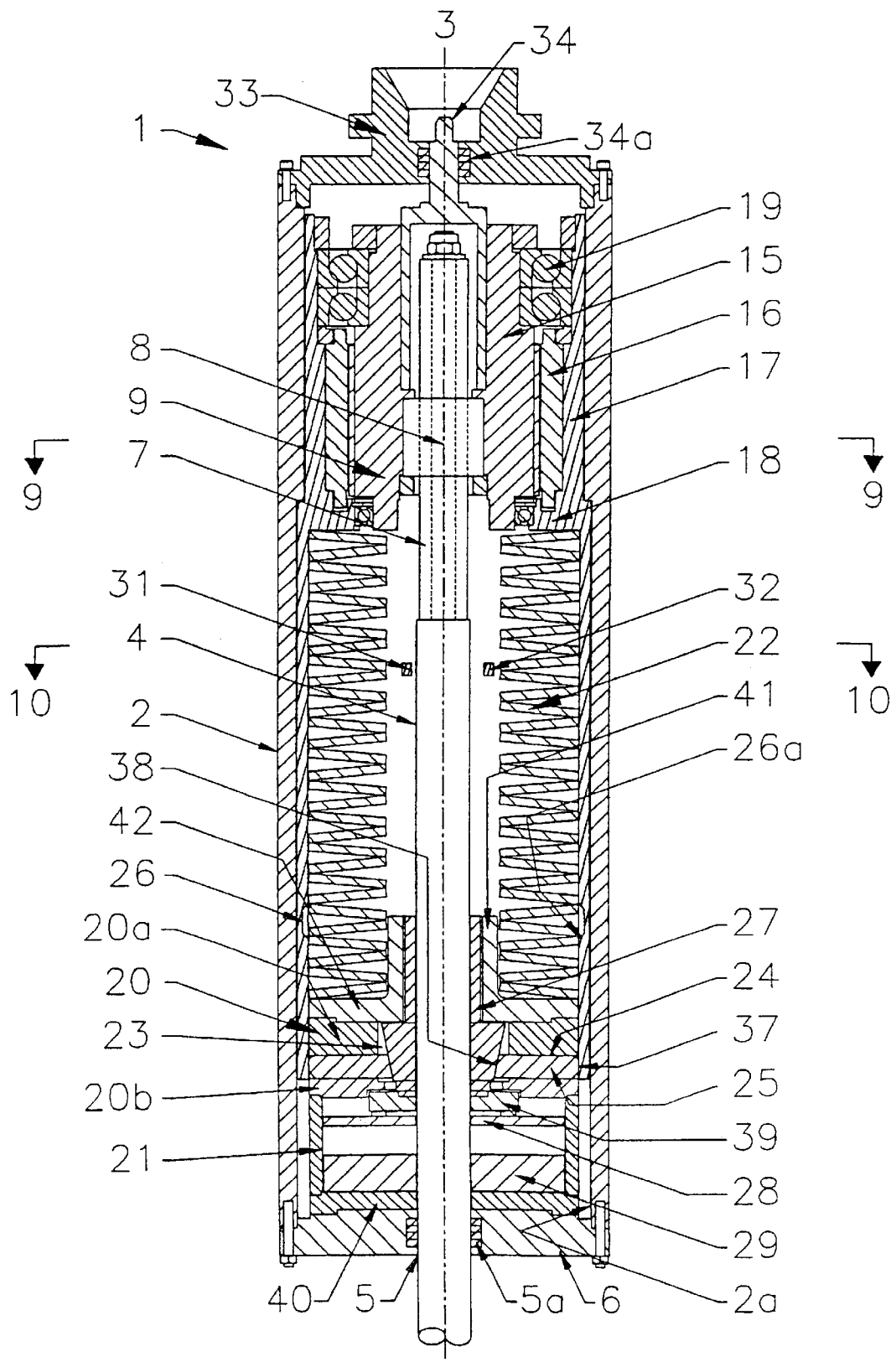
FIG. 1 is a sectional view of a valve actuator according to an embodiment of the invention.
Figure 2:
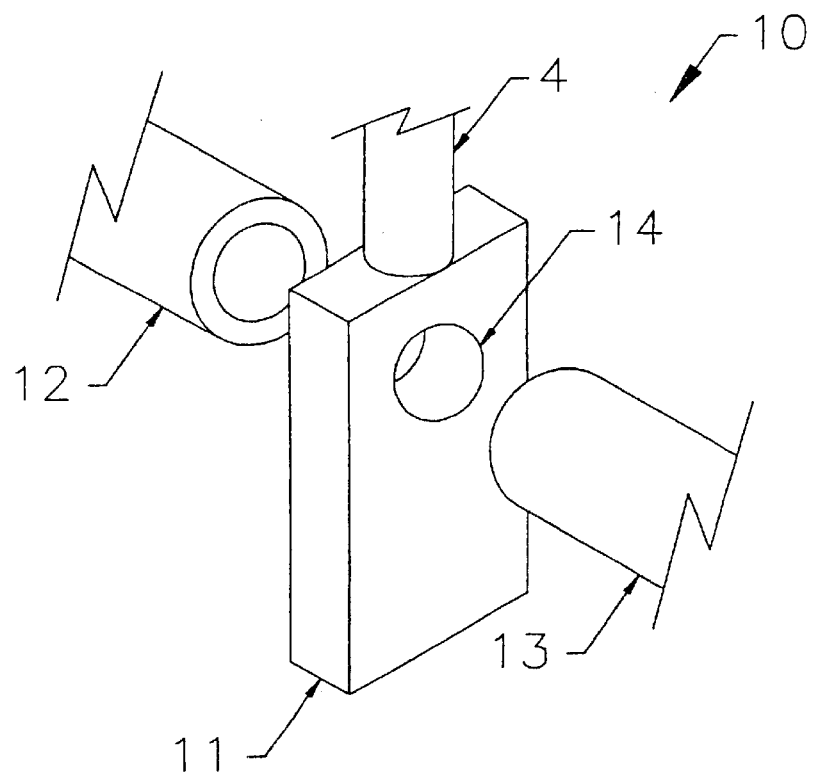
FIGS. 2 and 3 are schematic exploded isometric views of a gate valve, to which the valve actuator is attached, shown in its open and closed positions respectively.
Figure 3:
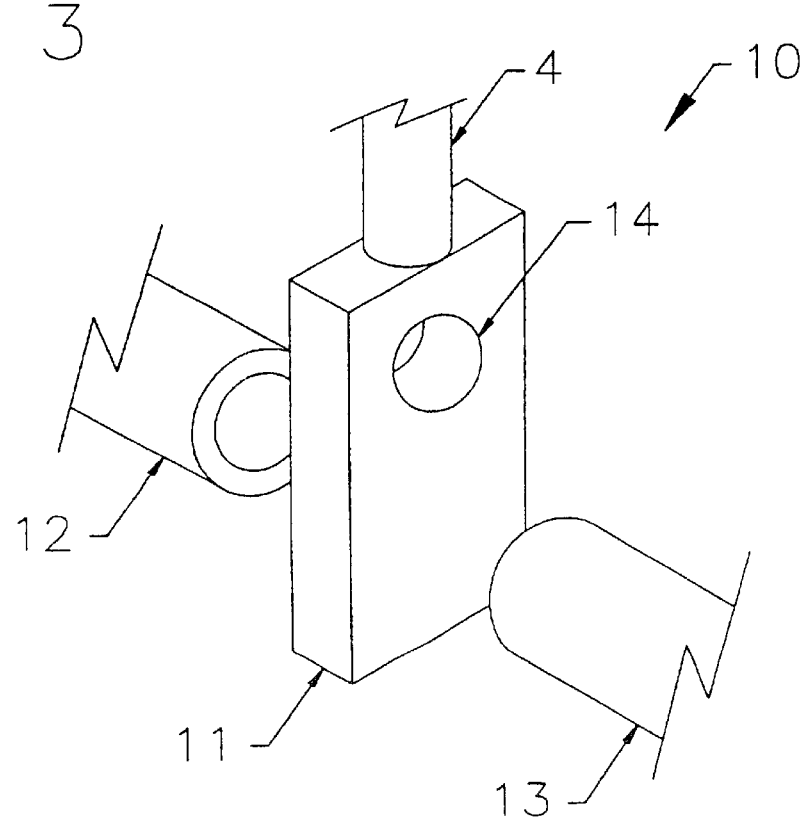

Referring to FIG. 1 of the accompanying drawings, the valve actuator 1 comprises a cylindrical housing 2. Along the longitudinal axis 3 of the housing is an actuator stem 4 which projects through an orifice 5 in a base 6 of the housing. The part of the actuator stem 4, which projects beyond the housing 2, has a backseat or stop 30 (see FIG. 4) which can bear against the base 6 of the housing 2. The actuator stem 4 projects beyond the backseat 30 and is attached to a gate valve 10, shown schematically in FIGS. 2 and 3. The gate valve comprises a plate 11 which is placed between two coaxial pipes 12,13. The plate has an aperture 14 which is the same diameter as the internal diameter of the pipes 12,13.

Extending from the end of the actuator stem 4 within the housing 2 is a hollow screw shaft 7, having an exterior screw thread which is engaged by internal threads of a cylindrical roller screw 8 which surrounds the shaft 7. The roller screw 8 is a low friction device which has ball, disc or cylinder type rolling elements. The roller screw 8 is rigidly secured to and rotated directly by a rotor 15 of a permanent magnet brushless DC torque motor 9 which has a stator 16 surrounding the rotor 15. The motor 9 is provided with thrust bearings 19 for bearing axial loads and interconnecting the rotor 15 and the stator 16 enabling the rotor 15, and relevant components connected thereto, to rotate relative to the stator 16. The stator 16 is fixed or attached to the inside of a sleeve 17 and the former is mounted on an inwardly projecting flange 18 of the sleeve. The sleeve acts as a piston and is adapted to slidingly engage an inner surface 2a in the cylindrical housing 2 and is displaceable along its longitudinal axis 3. The sleeve 17 has an annular recess 26 in its inside surface to receive square-section locking sliders 25 which form part of a locking mechanism (described in detail below) for locking the sleeve 17 against axial movement relative to the housing 2.

At least partially within the end of the sleeve 17 opposite to that accommodating the motor 9, is a cylindrical slider support block or carrier 20 for supporting the locking sliders 25 which has a central aperture 23 through which the actuator stem 4 is displaceable. The slider support block 20 has an external diameter slightly less than the internal diameter of the sleeve 17 and comprises an upper block member 20a and a lower block member 20b. The lower block member 20b comprises a plate which is connected to the base 6 of the housing 2 by a cylinder or ring 21 and studs extending therethrough. The ring is spaced inwardly from the inner surface 2a of the housing 2 thereby allowing a lower end of the sleeve 17 to slide downwardly (as in FIGS. 5 to 7) and around and relative to the slider support block 20. The upper block member 20a comprises a plate with twelve radial protrusions on the underside of the plate, the bottom of these protrusions being attached to the lower block member plate. These protrusions define twelve radially disposed passages, guides or slots 24. Each passage 24 has a radially slidable square-section locking slider or bolt 25 located therein. Each locking slider 25 is slightly longer than the passage 24 so that the locking slider 25 projects beyond the outer circumference of the slider support block 20 and/or into the aperture 23. The outward ends 37 of the locking sliders 25 are adapted for engaging the sleeve recess 26 and the opposite inner ends 38 are chamfered. The chamfered inner ends 38 are engaged by an annular frusto-conical wedging member 27 which tapers in a downward direction, is slidable along the actuator stem 4 and is accommodated within the aperture 23. An armature plate 28, comprising material attractive to an electromagnet, is attached to the narrower lower end of the conical wedging member 27 via a ring connector 39. The armature plate 28 extends beneath the slider support block 20 and is positioned inside the ring 21 which connects the slider support block 20 to the base 6 of the housing 2 so as to be displaceable along the longitudinal axis 3 of the actuator 1. An electromagnet 29 is connected to the base 6 of the housing 2 via a plate 40, the plate 40 being bolted to the base 6 and the electromagnet 29. The electromagnet 29 is also connected to a low power supply which may be 24V. The armature plate 28, the ring connector 39, the electromagnet 29 and the plate 40 all have a central aperture through which the actuator stem 4 is displaceable.

Above the upper block member 20a of the slider support block 20 is a cylindrical member 41 through which the actuator stem 4 is displaceable. The cylindrical member 41 has an outwardly projecting flange 42 at its base which is bolted to the top of the upper block member 20a. Situated between the flange 42 and the underside of the inwardly projecting flange 18 is a disc spring stack 22. The stack 22 comprises a plurality of springs coaxially arranged about the longitudinal axis 3 and the stack 22 has a central opening defining a passage along which the actuator stem 4 is displaceable.

The apparatus within the housing 2 is contained within an oil-filled and pressure balanced environment to allow for operation of the valve actuator 1 underwater. To maintain this environment, there is a sealed connection 5a between the base 6 of the housing 2 and the projecting actuator stem 4.

The valve actuator 1 is connected to an electronic drive package (not shown) which is housed in a subsea control module at one atmosphere via cables and electrical stab connectors. The drive package is used to activate components within the valve actuator. The drive package is connected to an actuator stem sensor 31 and a spring stack sensor 32 both located so that the drive package can monitor movement of the actuator stem 4 and the disc spring stack 22.

At the top of the housing 2 is a remote operating vehicle (ROV) interface 33 which allows an ROV to interconnect with the valve actuator 1. The ROV interface has an ROV intervention point 34 which is centrally positioned on the longitudinal axis 3 and is splined to the motor rotor 15. A seal 34a between the interface 33 and the intervention point 34 seals the inside of the housing 2 from the outside. The ROV interface also has a visual position indicator.

Figure 9:
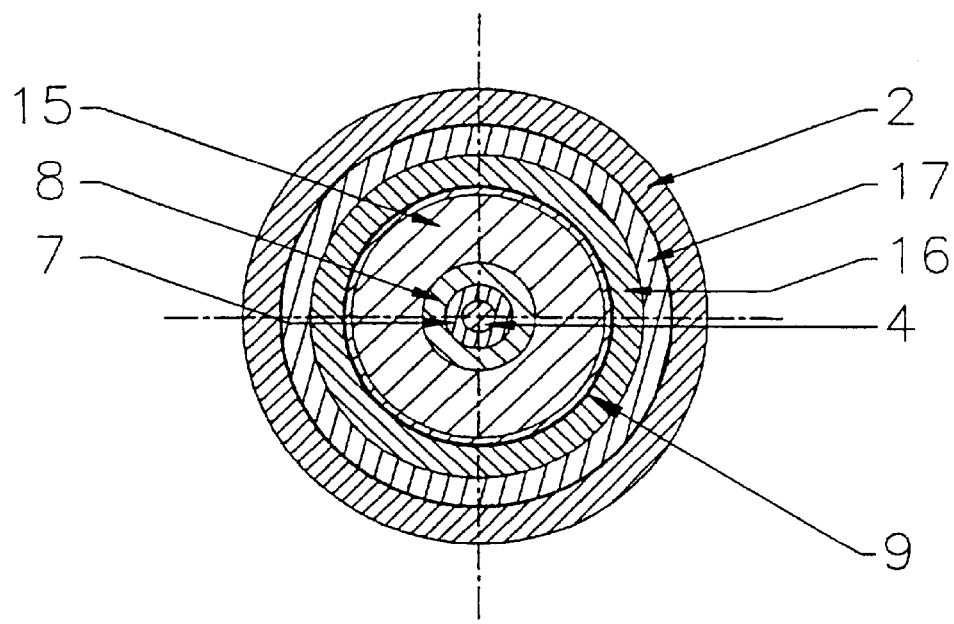
FIGS. 9 and 10 are transverse cross-sections taken along lines 9—9 and lines 10—10 of FIG. 1 respectively.
Figure 10:
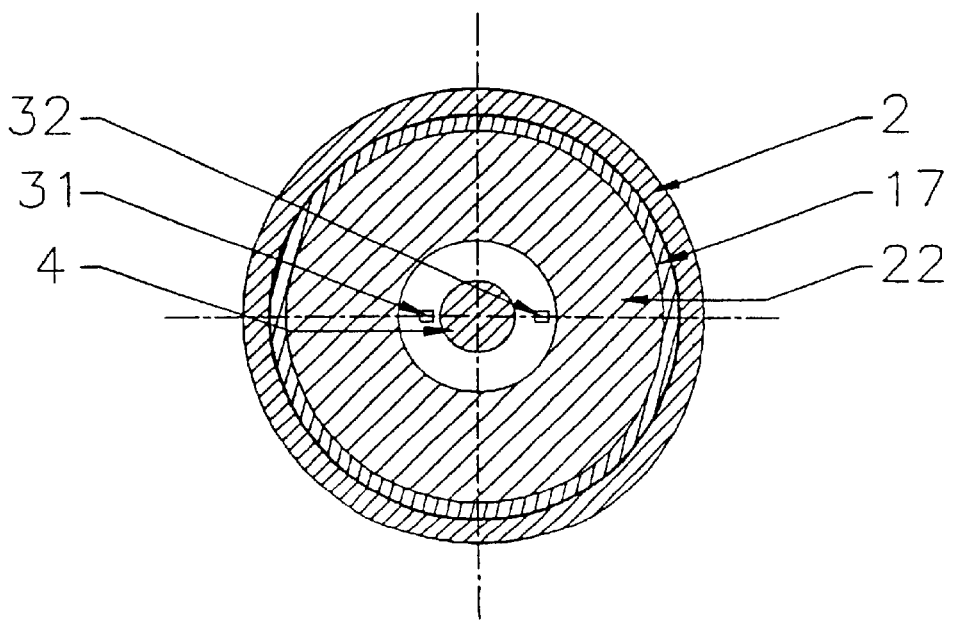

FIG. 9 shows a transverse cross-section through the valve actuator 1, the cross-section illustrating the actuator stem 4, the roller screw 8 and motor 9, and FIG. 10 shows a transverse cross-section through the valve actuator 1, the cross-section illustrating the actuator stem 4 and the disc-spring stack 22.

Referring to FIGS. 4 to 8, the operation of the valve actuator 1 will now be described.

Figure 4:
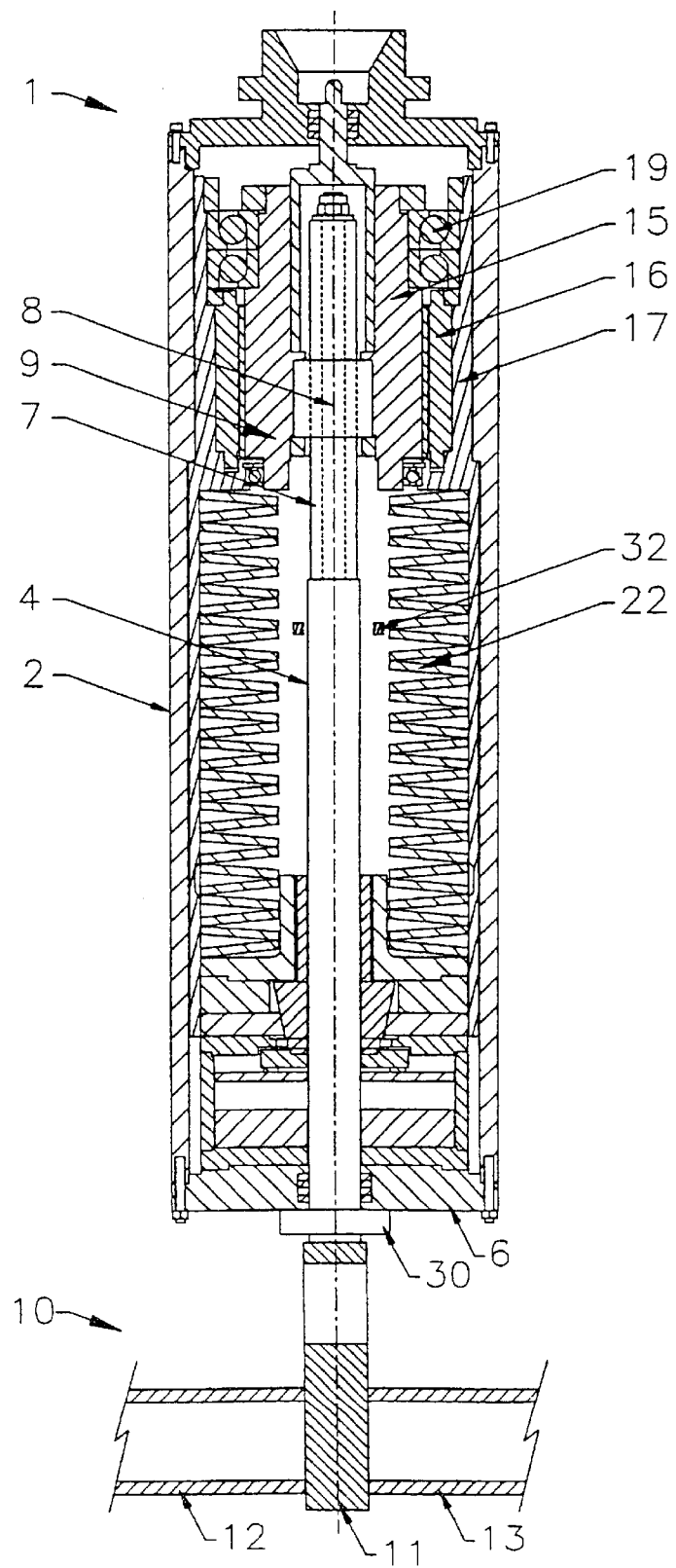
FIGS. 4 to 8 are sectional views showing the valve actuator in various stages of operation.

The valve actuator 1 is initially in its neutral position with the disc spring stack 22 unenergised and in its neutral extended state, as shown in FIG. 4. The backseat 30 of the actuator stem 4 abuts the base 6 of the housing 2 and the gate valve 10 is closed, the plate 11 being positioned so as to prevent any flow between the pipes 12,13.

The first step is to energise the disc spring stack 22 by compressing it. The electronic drive package determines that the stack 22 is not energised from the spring stack sensor 32. The motor 9 is activated by control signals being sent to the drive package which causes the rotor 15 to rotate in a first direction within the stator 16 via the thrust bearings 19. The rotation of the rotor 15 causes the roller screw 8 to rotate in the same direction.

Figure 5:
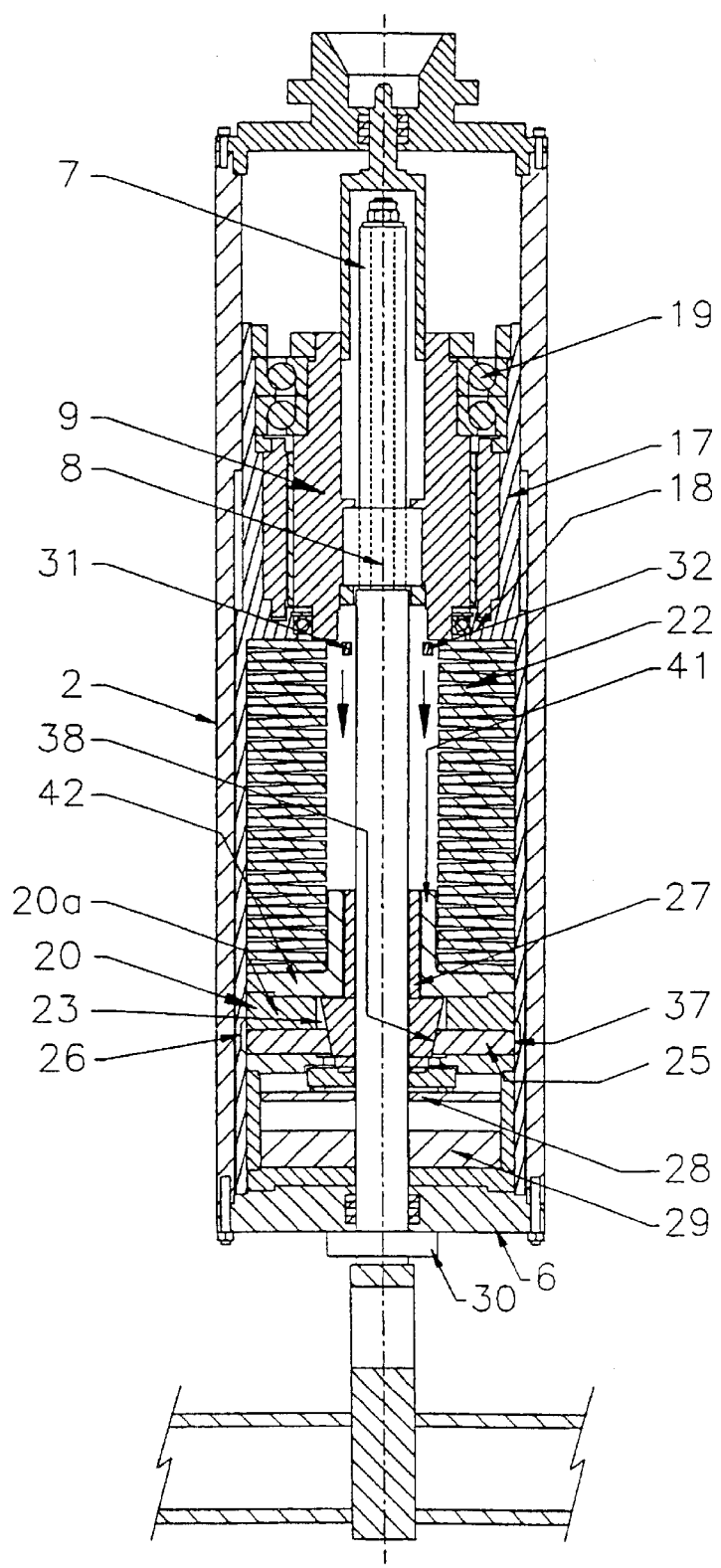

Referring to FIG. 5, as the backseat 30 of the actuator stem 4 abuts the base 6, the rotation of the roller screw 8, which is in engagement with the exterior screw thread on the hollow screw shaft 7, causes the sleeve 17, to which the roller screw 8 is attached via the motor 9, to be moved in a downward direction relative to both the actuator stem 4 and the housing 2 to the position shown in FIG. 5. Thus, the inwardly projecting flange 18 of the sleeve 17 transfers load to the disc spring stack 22 and compresses the stack 22 against the outwardly projecting flange 42 of the cylindrical member 41 attached to the slider support block 20 connected to the housing 2 and the resulting axial loading is born by the thrust bearings 19. However, if the gate valve 10 was initially not already closed, the backseat 30 would not be abutting the base 6. Hence, the activation of the motor 9 by the drive package would cause the actuator stem 4 to be partially retracted into the housing 2, closing the valve 10 and causing the backseat 30 to abut the base 6 before the disc spring stack 22 was compressed.

The electronic drive package determines that the backstop 30 is abutting the base 6 from the actuator stem sensor 31 which monitors the position of the actuator stem 4 relative to the housing 2 and that the disc spring stack 22 is being compressed from the spring stack sensor 32. The drive package causes the electromagnet 29 to be energised by the 24V power supply which attracts the armature plate 28, attached to the frusto-conical wedging member 27. When the sleeve 17 has not been moved sufficiently downwards for the annular recess 26 to be aligned with the locking sliders 25, the downward movement of the conical wedging member 27, which is in engagement with the chamfered ends 38 of the locking sliders 25, drives the locking sliders 25 radially outwards so that the outward ends 37 are driven against the inner surface of the sleeve 17. This causes the chamfered ends 38 to protrude into the aperture 23 of the slider support block 20 blocking any further downward movement of the conical wedging member 27.

Figure 6:
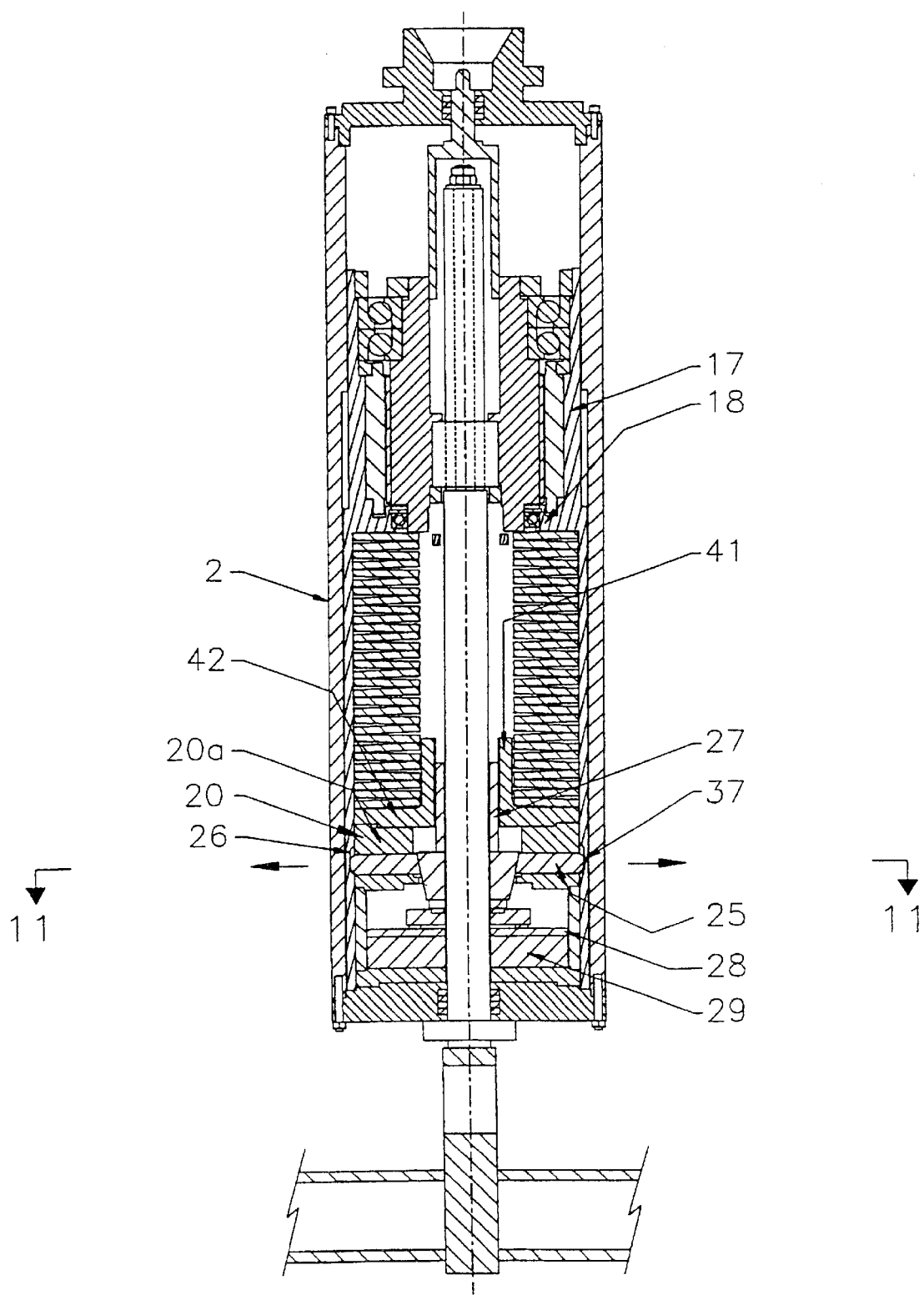
Figure 11:
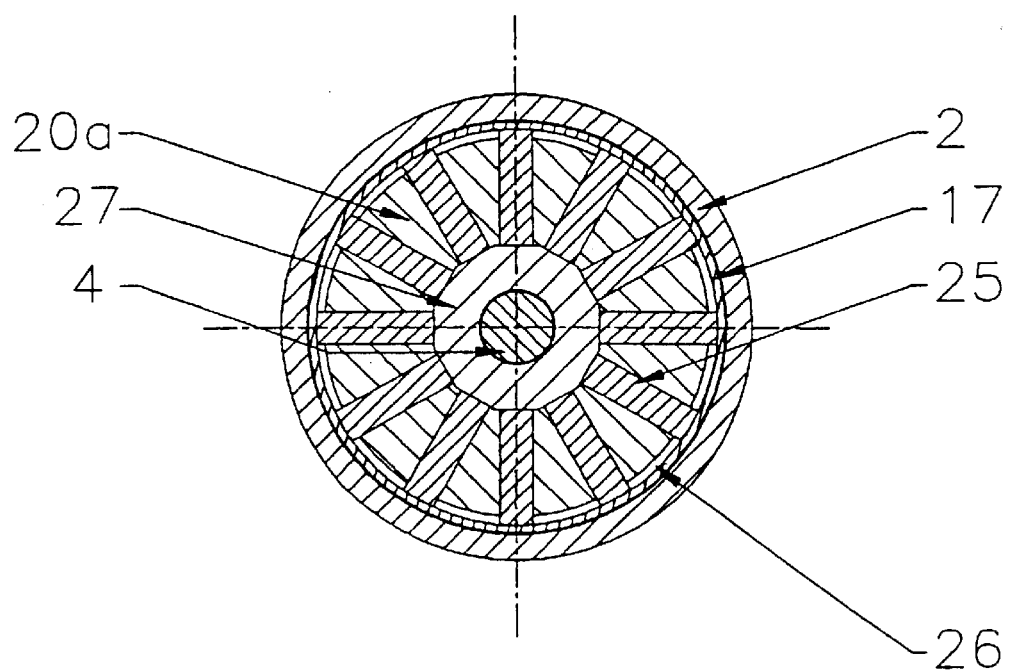
FIG. 11 is a transverse cross-section taken along line 11—11 of FIG. 6.

Referring to FIG. 6, when the axial movement of the sleeve 17, relative to the housing 2, causes the sleeve recess 26 to be aligned with the locking sliders 25 in the slider support block 20, there is downward movement of the conical wedging member 27 as the latter drives the locking sliders 25 radially outwards so that the outward ends 37 are driven into the annular recess 26. The locking sliders 25 being shown driven into the annular recess 26 are also illustrated in FIG. 11 which is a transverse cross-section through the valve actuator 1. Thus, the disc spring stack 22 is locked in a compressed state between the inwardly projecting flange 18 of the sleeve 17 and the outwardly projecting flange 42 of the cylindrical member 41 above the slider support block 20 and the sleeve 17 resists the expansive force of the disc spring stack 22 and is locked against axial movement relative to the housing 2. At the same time that the locking sliders 25 are driven into the annular recess 26, the armature plate 28 makes contact with the energised electromagnet 29.

Electronic logic interlocks in the drive package ensure that no other operation is performed by the valve actuator 1 until the disc spring stack 22 has been energised and locked in a compressed state.

Figure 7:
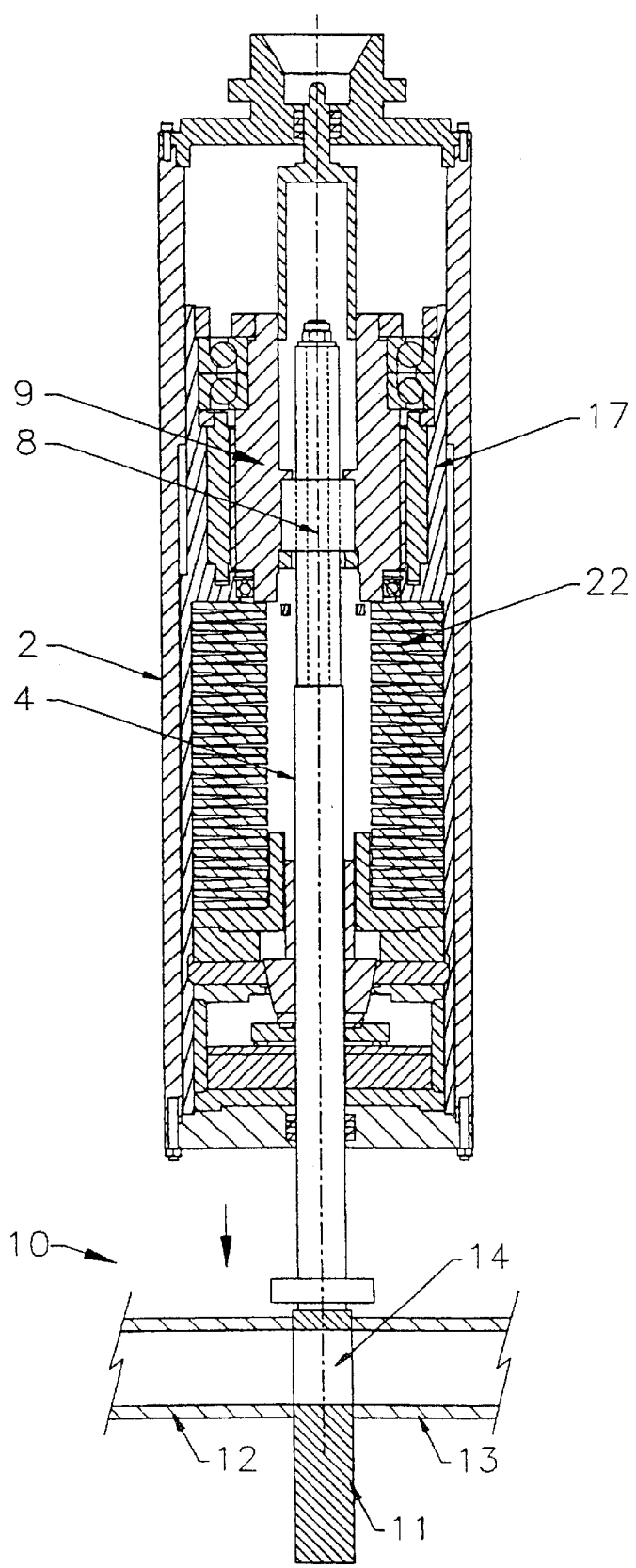

Referring to FIG. 7, the gate valve 10 can be opened in a controlled manner by control signals being sent to the electronic drive package which causes the motor 9 to rotate the roller screw 8 in the opposite direction. This causes the actuator stem 4 to be driven partially out of the housing 2 to a position that causes the valve 10 to be in its open position in which the aperture 14 in the plate 11 is aligned with the pipes 12,13 to allow flow between the pipes 12,13. To close the valve 10 in a controlled manner, the motor 9 simply rotates the roller screw 8 in the first direction causing a retraction of the stem 4 so that the plate 11 prevents any flow between the pipes 12,13 (i.e. the actuator 1 returns to the state shown in FIG. 6). Thus, the valve 10 can be put through an opening and closing cycle by the motor 9 without the motor 9 having to compress or energise the disc spring stack 22 or release or de-energise the disc spring stack 22.

Figure 8:
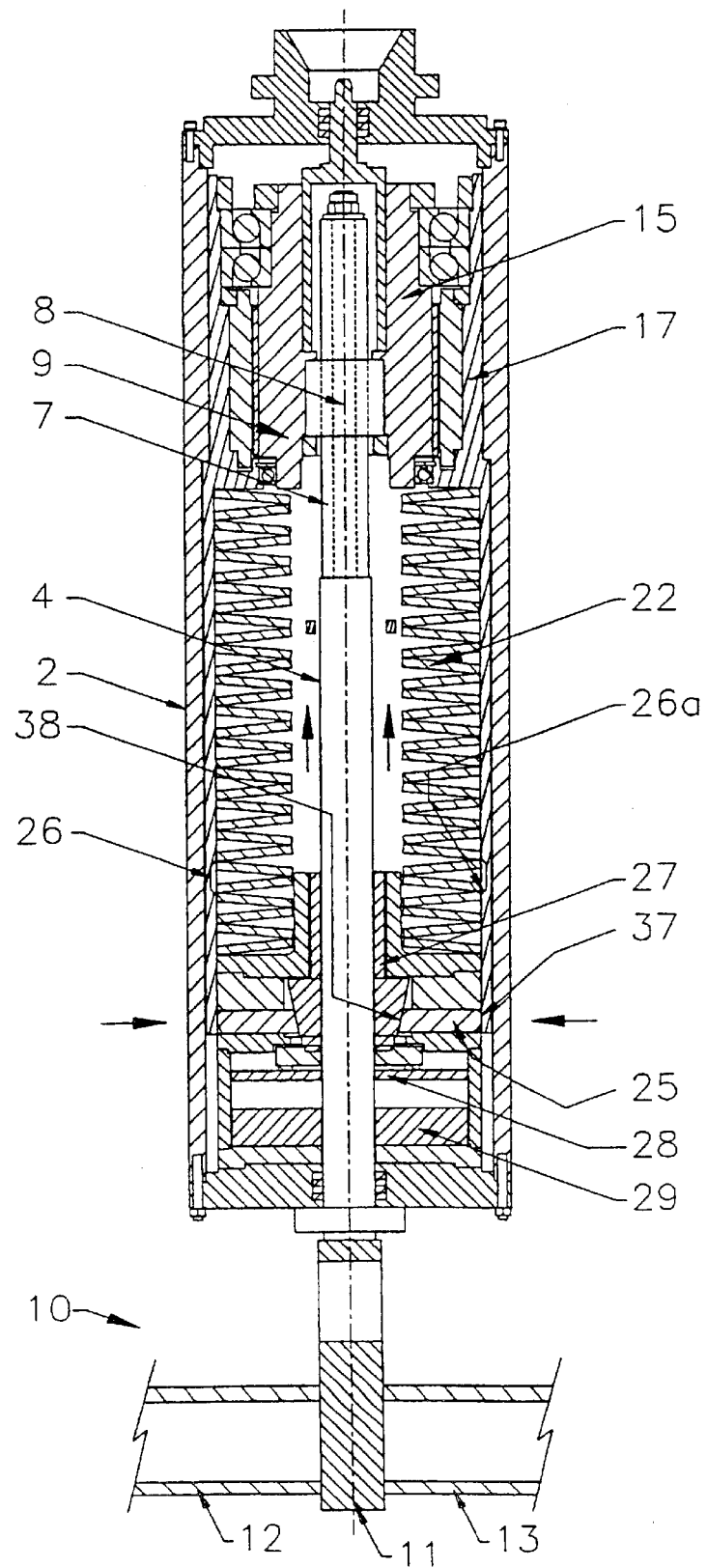

Referring to FIG. 8, to close the gate valve 10 in an emergency, control signals are directly sent to the power supply to the electromagnet 29 which is switched off. If there is a loss of power, this power supply automatically switches off. In either case, this causes the armature plate 28 to be released from the electromagnet 29. Thus, the outward ends 37 of the locking sliders 25 are no longer held outwardly in the annular recess 26 of the sleeve 17 by the conical wedging member 27 connected to the armature plate 28. Upward force exerted by the disc spring stack 22 on the sleeve 17 causes a camming action between a lower surface 26a of the annular recess 26 and the locking slider outward ends 37 urging the locking sliders 25 inwardly out of engagement with the recess 26. Hence, the disc spring stack 22 is unlocked and returns to its neutral state, pushing the sleeve 17 upwards relative to the housing 2. The outward ends 37 of the locking sliders 25 are now adjacent the inner surface of the sleeve 17 and the chamfered ends 38 forcibly engage the conical wedging member 27 pushing the latter upwards to the location shown in FIG. 8. The annular recess 26, the locking sliders 25 and the conical wedging member 27 all have calculated angled contact surfaces to allow this to happen and the disc spring stack 22 has a force/displacement profile to match the valve 10. The upward movement of the sleeve 17 lifts the attached motor 9 and the threaded hollow screw shaft 7, engaged by the roller screw 8 rigidly secured to the motor rotor 15 upwards. Thus, the actuator stem 4 is partially retracted into the housing 2, causing the gate valve 10 to be closed as the plate 11 prevents any flow between the pipes 12,13.

The actuator stem sensor 31 and the spring sensor 32 give full valve position feedback to the electronic drive package over the entire stroke of the sleeve 17. The sequence set out above can be repeated by sending the relevant control signals.

The ROV interface 33 allows the valve actuator 1 to be manually overridden by an ROV, according to recognised standards. The visual position indicator allows the valve position to be visually monitored when the valve actuator 1 is manually overridden by an ROV.

An advantage of the described valve actuator 1 is that the motor 9 drives the roller screw 8 directly without requiring gearing. The oil-filled retaining sleeve 17 acts as an oil damper controlling the speed at which the gate valve 10 is closed in an emergency, the oil passing through the thrust bearings 19 as the sleeve 17 is pushed upwards, relative to the housing, by the released disc spring stack 22. An orifice plate might be added above the thrust bearings 19 to improve the dampening. Another advantage is that all fundamental control is carried out locally in the drive package so that the electrical interface to the valve actuator 1 is simple and can be configured to suit the operator by using systems such as fieldbus protocols.

The valve actuator 1 can be used in any application where a fail-safe actuator is required. It can be used to replace conventional subsea hydraulic actuators on seabed equipment such as subsea trees with considerable benefits such as being able to be used at much greater depths. The actuator 1 may, for example, be used in electric seabed processing systems.

By having the motor 9 fixed to the inside of the sleeve, there is no need to have a splined actuator stem, thus simplifying the valve actuator 1 and hence making it cheaper to manufacture.

Whilst a particular embodiment has been described, it will be understood that various modifications may be made without departing from the scope of the invention. For example, the valve actuator may be configured to open a valve in an emergency instead of closing the valve. The valve actuator can be used with any type of valve which requires linear movement to open or close it. With suitable drive means, however, the actuator could also be applied to rotary valves. A ball screw or a plain nut, for example, may be used instead of the roller screw. The size of the orifice in the sleeve can be adjusted to tailor the closing speed of the valve. An induction motor may be used instead of the permanent magnet brushless DC torque motor. The slider support block may have any suitable number of passages.

The slider support block may comprise a single member with radially disposed through bores instead of passages. Any suitable number of locking sliders may be used and the locking slider may not be limited to having a square section and may be of any suitable shape, such as being cylindrical. Instead of being an annular recess in the sleeve, there may be a plurality of recesses with there being a recess for each locking slider

What is claimed is:

1. A valve actuator (1) comprising:

a housing (2);

an actuating member (4) partly contained within the housing and movable relative to the housing;

drive means (8,9) arranged to drive the actuating member (4) between first and second positions to reconfigure a valve (10) between first and second states;

energisable resilient means (22) within the housing;

locking means (25,26,27) for locking the resilient means in an energised state, the locking means permitting the drive means to drive the actuating member from either of its positions to its other position without substantially energising or de-energising the resilient means when the resilient means is locked by the locking means;

release means (28,29) for releasing the resilient means from the locking means, to cause the actuating member to be moved under the influence of de-energisation of the resilient means to one of its positions and thereby reconfigure the valve from one to the other of its states; and load transfer means (17) displacably mounted within the housing (2) and being biased relative to the housing by the resilient means (22), characterised in that the locking means includes the load transfer means (17) which is slidably mounted about the actuating member (4); and the resilient means (22) is arranged to be energised by the drive means (8,9) operatively engaging the actuating member (4) and moving the load transfer means (17) relative to the housing (2) and the actuating member (4) to a position in which the locking means (25, 26, 27) can lock the resilient means in an energised state.

2. A valve actuator as claimed in claim 1, wherein the drive means (8,9) is rigidly connected to the load transfer means (17).

3. A valve actuator as claimed in claim 1, wherein the actuating member (4) has a stop (30) for engaging the housing (2), the drive means (8, 9) causing the resilient means (22) to be energised when the stop has engaged the housing.

4. A valve actuator as claimed in claim 1, wherein the locking means comprises at least one movable bolt (25) held substantially within carrier means (20) rigidly connected to the housing (2).

5. A valve actuator as claimed in claim 4, wherein the locking means includes bolt engaging means (27) for engaging said at least one bolt (25), said bolt engaging means being connected to the release means (28,29) and being slidably mounted within the housing (2).

6. A valve actuator as claimed in claim 5, wherein the locking means comprises at least one recess (26) in the load transfer means (17), the at least one recess arranged to receive at least one bolt (25) forcibly engaged by the bolt engaging means (27) to lock the resilient means (22) in an energised state.

7. A valve actuator as claimed in claim 5, wherein the bolt engaging means comprises wedging means (27).

8. A valve actuator as claimed in claim 5, wherein the bolt engaging means comprises an annular frusto-conical wedge (27).

9. A valve actuator as claimed in claim 5, wherein the release means includes a first release part (28) connected to the bolt engaging means (27) and displacable with respect to the housing (2), and a second release part (29) fixed with respect to the housing (2), the first and second release parts arranged to be biasable towards each other.

10. A valve actuator as claimed in claim 9, wherein the first and second release parts comprise an electromagnet (29) and material (28) attractable to the electromagnet when the electromagnet is magnetised.

11. A valve actuator as claimed in claim 4, including a plurality of said bolts (25), and carrier means (20) comprising radially disposed guides (24), each guide containing one of said bolts (25) and each bolt being radially displacable.

12. A valve actuator as claimed in claim 1, wherein the load transfer means comprises a piston like member (17).

13. A valve actuator as claimed in claim 1, wherein the housing (2) is filled with oil.

14. A valve actuator as claimed in claim 1, wherein the valve actuator (1) is pressure balanced within the housing (2).

15. A valve actuator as claimed in claim 1, including an actuating member sensor (31) and/or resilient means sensor (32) so that a drive package can monitor movement of the actuating member (4) and/or the resilient means (22).

16. A valve actuator as claimed in claim 1, wherein the resilient means comprises at least one spring (22) which is arranged to be energised and locked in place by the locking means, allowing the valve (10) to be subsequently operated without working against the at least one spring.

17. A valve actuator as claimed in claim 1, wherein the drive means (8, 9) operably engages the actuating member (4) by threaded engagement means (7, 8).

18. A valve actuator as claimed in claim 17, wherein the actuating member (4) has a screw shaft (7) and the drive means has threaded means (8) for engaging the screw shaft so as to drive the actuating member.

19. A valve actuator as claimed in claim 18, wherein the drive means includes a rotary motor (9) which drives the threaded means (8) and surrounds the screw shaft (7).

20. A valve actuator as claimed in claim 19, wherein the load transfer means comprises a piston like member (17) and the rotary motor (9) is rigidly connected to the inside of the piston like member (17).

21. A valve actuator as claimed in claim 18, wherein the threaded means (8) comprises rolling elements for engaging the screw shaft (7).

22. A valve actuator as claimed in claim 1, wherein the valve actuator (1) is adaptable to be operable underwater.

23. A valve actuator as claimed in claim 1, wherein the actuating member (4) is connected to a gate valve (10).

24. A valve actuator as claimed in claim 1, wherein the housing (2) substantially contains the drive means (8, 9), the locking means (25, 26, 27) and the release means (28, 29).

25. A method of operating a valve actuator (1) comprising an actuating member (4) partly contained within a housing (2), comprising the steps of:

biasing load transfer means (17) displaceably mounted within the housing (2) relative to the housing by resilient means (22) within the housing;

locking the resilient means (22) in an energised state;

driving the actuating member (4) by drive means (8,9) between first and second positions to reconfigure a valve (10) between first and second states without substantially energising or de-energising the resilient means (22); and releasing the resilient means (22) from being locked, causing the actuating member (4) to be moved under the influence of de-energisation of the resilient means (22) to one of its positions and thereby reconfigure the valve (10) from one to the other of its states; characterized by the steps of slidably mounting the load transfer means (17) about the actuating member (4) within the housing (2); and operatively engaging the actuating member (4) with the drive means (8,9) to move the load transfer means (17) relative to the housing (2) and the actuating member (4) to energise the resilient means (22) before the locking step.

* * * * *